United States Patent [19]

Graves et al.

[11] 4,071,071
[45] Jan. 31, 1978

[54] TIRE BELT REMOVAL

[75] Inventors: Thomas W. Graves; Ronald Seiler, both of Muscatine, Iowa

[73] Assignee: Bandag Incorporated, Muscatine, Iowa

[21] Appl. No.: 725,159

[22] Filed: Sept. 21, 1976

[51] Int. Cl.² .......................................... B29H 21/00
[52] U.S. Cl. .................................................... 157/13
[58] Field of Search ......................................... 157/13

[56] References Cited

U.S. PATENT DOCUMENTS

| 2,645,147 | 7/1953 | Hawkinson ........................ | 157/13 |
| 3,002,549 | 10/1961 | Boussou et al. ................... | 157/13 |
| 3,888,145 | 6/1975 | Heaton et al. ..................... | 157/13 X |

FOREIGN PATENT DOCUMENTS 1,158,244  11/1963  Germany ................................ 157/13

Primary Examiner—James L. Jones, Jr.
Assistant Examiner—James G. Smith
Attorney, Agent, or Firm—Cushman, Darby & Cushman

[57] ABSTRACT

A method and apparatus is shown for preparing a tire carcass for recapping. The process is provided for use on steel belted tires having a steel belt or protector ply embedded in the tire structure as the outermost layer in a series of steel belts forming the other plies. An apparatus for performing the process is described wherein means are provided for severing a damaged belt or protector ply from the tire carcass and preparing the carcass for recapping, after which the carcass may be recappd in the normal manner used for rebuilding steel belted tires.

12 Claims, 5 Drawing Figures

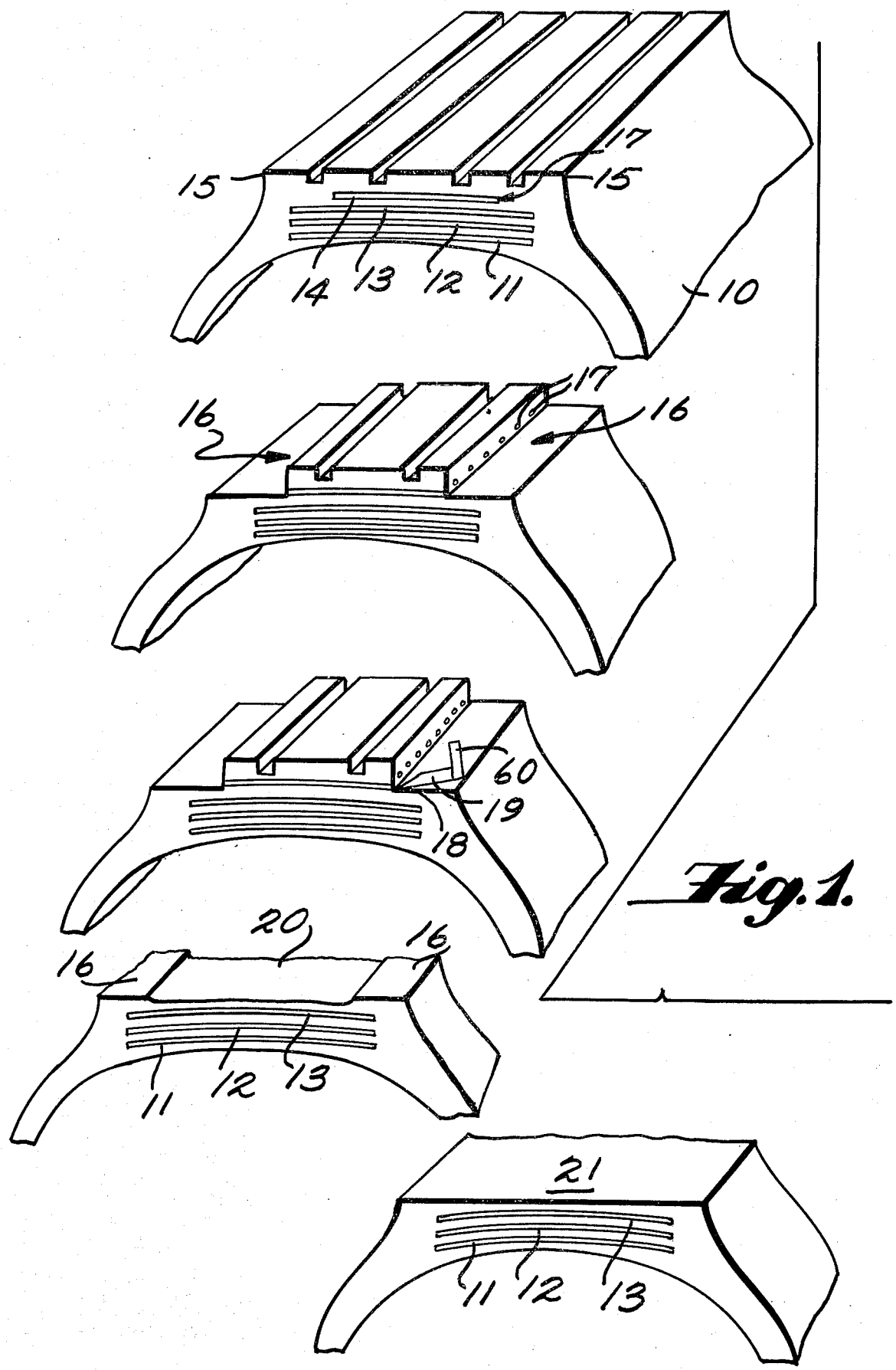

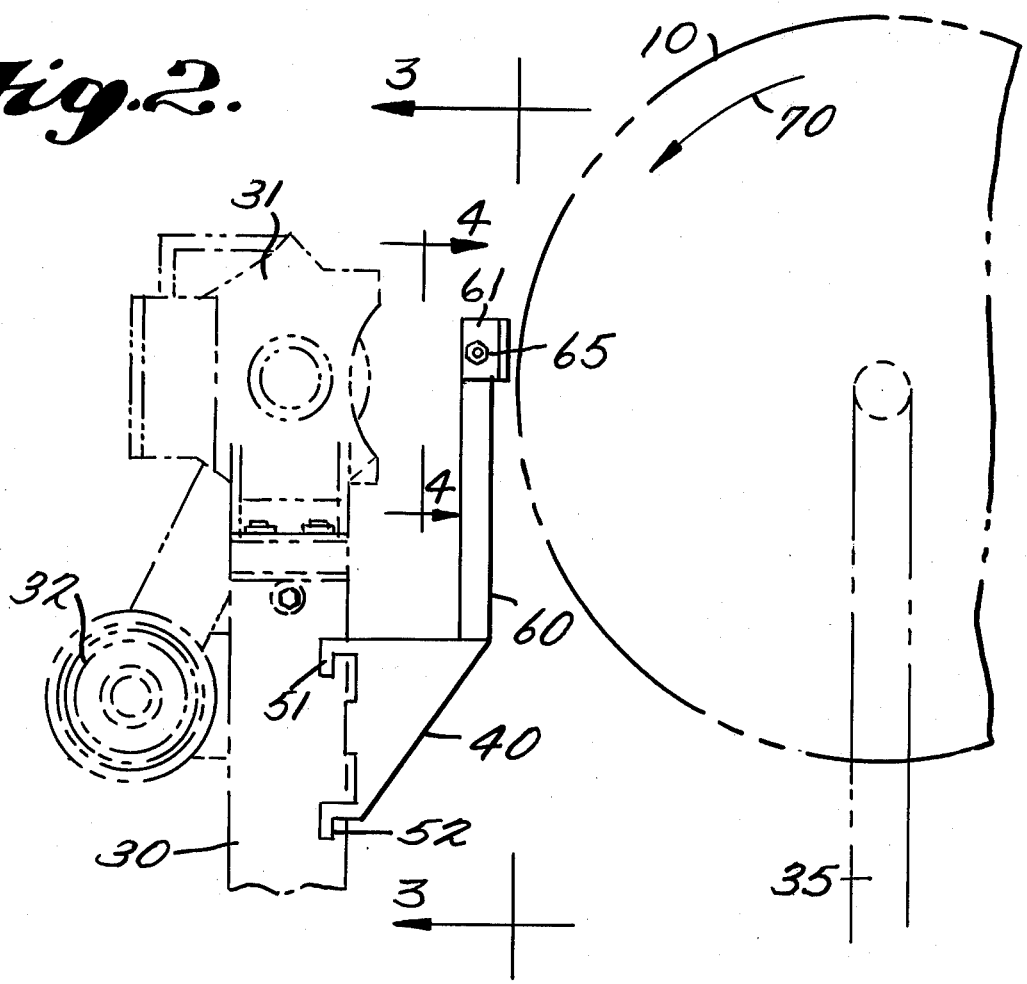
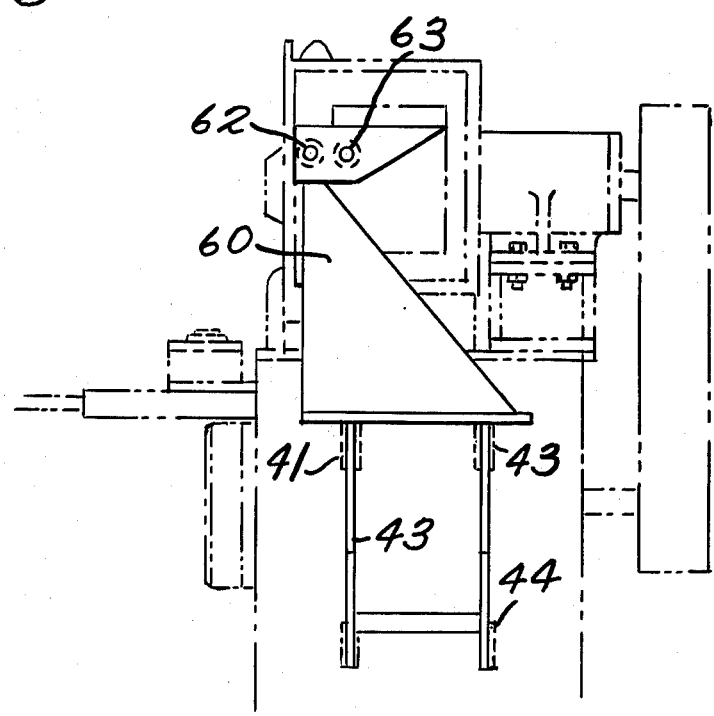

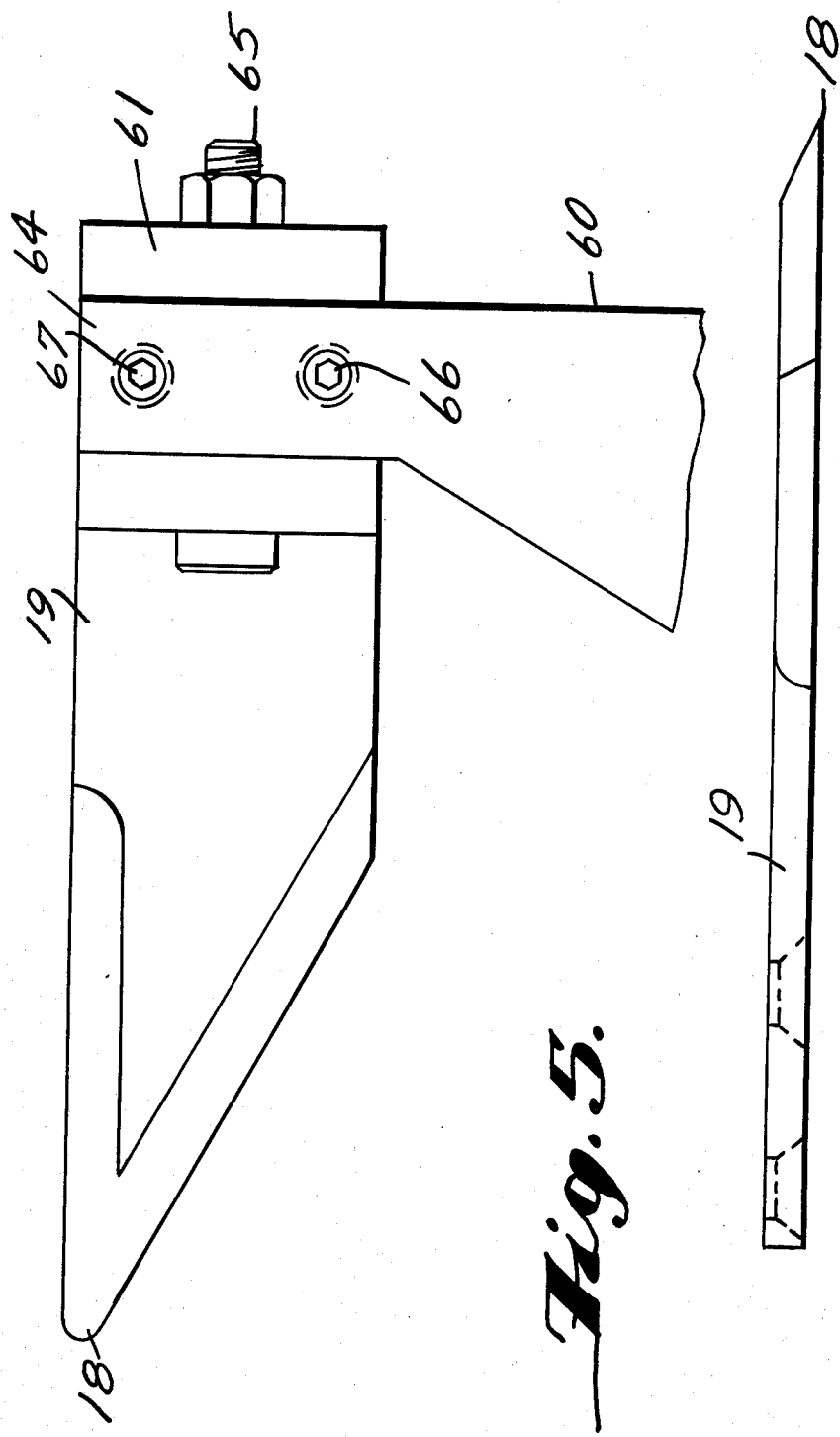

TIRE BELT REMOVAL

BACKGROUND

With the advent of the more expensive steel belted tire constructions, the retreading of worn steel belted tires has become an even more desirable procedure. However, it has been found, especially, when it is necessary to recap heavy duty steel belted tires having a steel belt or protector ply that was damaged, as by being cut through in use, that the additional work required to salvage the tire becomes burdensome. The extra cost of the skilled manual labor that must be used for skiving out the damaged area, removing any rust and filling in this area with repair material, adds greatly to the total cost of recapping the tire.

BRIEF DESCRIPTION

The process of this invention eliminates all or most of the manual work needed to prepare such a steel belted tire for recapping by effecting the complete and rapid removal of the entire damaged belt or protector ply. The apparatus of this invention is operative to sever the outer steel belt or protector ply from the carcass leaving the remaining steel belts in place. When only the top belt or protector ply has been damaged, after it has been removed, the tire carcass may be rasped to provide a smooth surface that may then be recapped in the usual manner whereby a great saving in labor has been realized. In any event, the removal of the protector ply or outermost steel belt substantially eliminates most of the damaged areas whereby to minimize the amount of expensive manual repair work that has to be performed, so that substantial savings are realized.

It is therefore an object of this invention to provide a process for more efficiently recapping tires having a steel protector ply situated over the other steel belts in the tire carcass.

Another object is to provide a recapping process for use on steel belted tires having a protector ply, which process makes it possible to minimize the use of manual labor in the preparation of the carcass for recapping.

Another object of the invention is to provide an improved knife structure to remove a steel belt or protector ply from a tire carcass being recapped.

Another object is to provide a knife for removing a steel belt or protector ply, the knife being supported on an adaptor means carried by the tire rasping stand whereby to utilize an existing rasping machine as an aid in the top belt or protector ply removal process.

Another object is to provide a process for severing a top belt or steel protector ply from a steel belted tire carcass that may be performed by making use of existing equipment.

These and other objects will appear more fully below.

IN THE DRAWINGS

FIG. 1 includes a series of diagramatic views showing the change of the carcass at each of the steps of the process;

FIG. 2 is a side elevation of a typical rasping station for preparing a tire carcass for recapping;

FIG. 3 is a view looking at the rasping station along line 3—3 of FIG. 2;

FIG. 4 is a detailed view looking at the knife blade holder along line 4—4 of FIG. 2; and FIG. 5 is a detailed top view of the knife blade.

DETAILED DESCRIPTION

Referring to FIG. 1, the progressive changes are illustrated which occur in the carcass of a steel belted tire having a top belt or protector ply that is removed by following the steps of the process of this invention. The damaged tire to be recapped is shown at the illustration at the top of FIG. 1, the tire being a steel belted construction having a protector steel ply in the undertread portion of the crown of the body or carcass 10 which also contains several additional steel belts 11, 12, and 13 disposed under the protector ply 14. The protector ply and steel belts form a part of the original tire assembly that is vulcanized in place when the tire is fabricated. During normal tire usage, the top belt or protector ply 14 may be cut or otherwise damaged when the tire is subjected to various kinds of abuse, especially when such steel belted tires are mounted on trucks. When the protector ply is cut through or even if it merely becomes exposed, it may rust and in either event, in the normal recapping procedure, the damaged or rusted area would have to be skived, repaired and then rasped, before the damaged carcass could be recapped, requiring the expenditure of a considerable amount of skilled manual effort, to in effect custom rebuild the damaged area preparatory to recapping.

To avoid this expense, the present procedure may be used on the worn tire to first cut away the top belt or protector ply to remove the cut or rusted areas whereby to minimize the necessity for manually repairing the carcass. To accomplish this, the tire carcass shown at the top of FIG. 1 is first rasped all around at least one but preferably both of its shoulders to remove the rubber in a shoulder 15 to produce the cut away section or open-sided groove indicated at 16 in the second sketch. The rasping away of the shoulder is carefully done with a conventionally sharp, driven rasping means, to expose the edges 17 of the top belt or protector layer 14. The rasping is discontinued however, just as or before the steel belt layer 13 is exposed. It is noted that the top belt or protector layer 14 is usually designed to have a lesser width across the crown of the tire carcass than that of belt 13, but the dimension of the protector ply is not essential to the practice of this invention, only that its edge or its opposite edges are exposed, whereupon rasping is discontinued.

After both the shoulder 15 of the damaged or worn tire have been rasped away, the tip 18 of a knife blade 19 is inserted in the space between the one edge 17 of the protector ply and over the next steel belt 13 that is positioned under the protector ply. The knife is rigidly mounted on a support frame carried by the rasp stand, as will be described below, and while the tire is rotatably driven, the knife is then moved across the crown of the tire to separate the steel top belt or protector ply from the tire carcass. The damaged outer ply or steel protector belt is thus cut away while the remaining steel belts 11, 12, and 13 remain in place on the carcass. After the protector ply has been completely severed from the carcass, the two rasped shoulder portions 16 will be exposed on the opposite sides of the severed crown of the tire carcass. The outer surface of the carcass is then rasped to provide the smooth finished surface 21 shown in the bottom sketch in FIG. 1.

Any further repairs needed in the surface of the carcass may then be made in surface 21. If any cuts appear therein, suitable skiving and repairs are made in the steel belted structure in a known manner. However, with the removal of the top belt or protector layer 14 in most instances all of the damaged areas are removed and if, in addition, further repair work is needed, it is usually of a very minor nature. After any such repairs have been made and the carcass has been otherwise prepared, in the known manner, a suitable length of tread is measured off to be applied to the periphery of the carcass. The tire is then removed from the rasping machine and subjected to conventional recapping procedures to complete the rebuilding of the tire.

The apparatus for performing the process described above is shown in FIGS. 2-5. The usual rasping station is shown in FIG. 2 wherein the rasp stand 30 is constructed in the usual form to carry the rasping head 31 and drive motor 32. The stand 30 is relatively movable toward and away from a pedestal 35 adapted to rotatably support the tire 10 in position to be acted upon by the rasping means 31 and knife 19. Suitable bearing means and drive motor to rotate the tire are provided but are not shown in the drawings. The periphery of the tire is held in close proximity to the driven rasping means 31 so that the shoulders 15 on both sides of the tire can be ground or rasped away in a known way, without burning the rubber.

After the shoulders have both been removed to leave surfaces 16 and edges 17 exposed as shown in FIG. 1, the rasp stand is backed away somewhat from the crown on the periphery of the tire carcass and a knife supporting frame 40 is mounted on the stand. For this purpose, the rasp stand 30 may be provided with delugger mounting slots 41, 42, 43 and 44 as best seen in FIG. 3. The knife frame 40 has integral lugs 51, 52, 53 and 54 that cooperate with the corresponding delugger slots for quickly mounting and demounting the knife support frame on the rasp stand. The support frame 40 carries an integral knife blade supporting wall 60 for rigidly carrying the knife blade 19 supported on a carrying block 61 in position to coact with the crown of the tire when the protector ply is to be cut free.

The knife blade 19 is bolted to the carrying block 61 by means of bolts 62 and 63. The block 61 preferably takes the form of a saddle that straddles the upper end of a post 64 integral with wall 60 and the saddle is adjustably carried on the post to occilate slightly about the axis of a bolt 65. The desired angular disposition of the saddle block about bolt 65 may be selected by suitable adjustment of bolts 66 and 67 carried at the upper end of post 64, the bolts 66 and 67 being positioned on opposite sides of support bolt 65. After the proper angular adjustment of the knife with respect to post 64 has been made, the bolts 66 and 67 are set in place and bolt 65 is drawn tight. The knife blade may be further adjusted relative to the surface of the crown of the rotating tire by means of the in and out adjustment and the angular adjustability of the rasp stand with respect to the crown of the tire.

With the construction described above, it is seen that the rasp can be brought to the crown of the tire and the shoulders 15 of the carcass can be removed on each side of the tread in following known procedures. After the shoulders have been cut back and the edges 17 of the top belt or protector ply have been exposed on each side of the crown, the rasping process is discontinued and the rasp stand is retracted.

The knife support frame may then be quickly attached to the rasp stand in a fixed position by inserting lugs 51, 52, 53 and 54 into their cooperating delugger slots 41, 42, 43 and 44 on the generally vertically disposed front face of the stand. The lugs on the knife frame and the slots in the face of the rasp stand are designed to cooperate in a manner to position the knife blade mounted on post 64 in position for proper engagement against the crown of the tire. When the knife has been set up in this manner, the rasp stand is turned to effect an angular adjustment of the planar face of the knife blade to position the knife blade at a convenient angle of about 10 degrees with respect to a plane approximately tangent to the crown of the tire and including the tip end or point of contact of the knife with the tire whereby to start the initial cutting action by positioning the tip below the protector strip but above the next underlying steel ply. The blade preferably is also initially adjusted to tilt the planar face about the axis of bolt 65 to move the heel of the knife slightly away from the surface of said plane tangent to the crown. As above stated, initially the blade is adjusted with the tip edge of the knife in the plane with the trailing portion of the planar face of the knife turned away from the plane of the crown. The cross-feed of the vise stand is then activated to carry the tip of the knife across the crown of the tire to separate the top belt or protector ply from the tire leaving the first steel belt under that ply and all the other belts intact.

The tire is rotatably driven during the severing operation in the direction of arrow 70 as shown in FIG. 2 as the rasp stand is adjusted to bring the tip of the knife into cutting contact with the tire. As soon as the cutting step begins and the cross-feed of the rasp stand in front of the tire is established, the angle of the trailing portion of the planar face of the knife is preferably changed from 10 degrees to about 5 degrees with respect to said tangent plane. Thus, as the cross-feed step is continued, the top steel belt or protector ply and all of the damaged area above it on the crown of the tire are cut away.

Upon completion of the cutting stroke across the crown of the tire, as shown in the next to bottom sketch in FIG. 1, the tire will have a surface contour represented by the two rasped surfaces 16 on the opposite sides of a slightly undercut crown portion 20. The area 20 is underlayed by the remaining steel belts such as 11, 12 and 13. At this stage of the reconditioning process, the knife frame is removed from the rasp stand and the rasping means is again brought into contact with the tire. The rasp is used to produce the smooth surface 21 shown in the bottom sketch in FIG. 1.

The carcass is then inspected and removed from the rasping machine. The carcass will normally be found to be in condition for immediate delivery to the recapping station in the factory but in some instances, further skilled manual repair work may be needed to remove minor damaged areas that extended through the top belt or protector ply and into the area beneath it. In all cases, however, the removal of the top belt or protector ply as above described eliminates all of the manual labor heretofore required to repair steel belted tires having damaged areas involving the top belt or protector ply structure and minimizes the manual repair required to recondition tires with more extensive damage that may extend below the top belt or protector ply.

As soon as the tire has been rasped to the condition shown in the sketch at the bottom of FIG. 1, and any additional repair work needed has been completed, the tire should be recapped before any of steel belting that has been exposed and cleaned during the rasping step has a chance to be affected by deleterious exposure to the atmosphere. The ultimate recapping procedure is performed in the known manner.

Truck tires having steel belt ply constructions have been salvaged following the above prescribed procedure. The resulting recapped steel belted tires have been used on commercial rigs successfully in both the drive wheel and the trailer positions.

While the above describes the preferred form of this invention, it is possible that modifications thereof may occur to those skilled in the art that will fall within the scope of the following claims.

We claim:

1. A method for conditioning a tire carcass for reliable recapping when a steel belted tire has a relatively narrow protector ply disposed over a plurality of steel plies, said protector ply being disposed within and around the cylindrical crown of the tire and having side edges ajacent the shoulder area of the tread, said edges being disposed over the area covered by the several additional steel plies positioned under the protector ply in the tire comprising first buffing a shoulder area of the carcass of a tire to be recapped to expose at least one of the edges of said protector ply, inserting the tip of a knife in the carcass under the protector ply and over the next steel ply under it, and relatively rotatably driving the tire and moving the knife across the surface area of the crown of the tire whereby to sever the protector ply from the carcass.

2. A method as in claim 1 wherein the shoulder area is buffed from the outside of the shoulder inwardly and then crosswise of the crown of the tire from the side to expose the edge of said protector ply.

3. A method as in claim 2 wherein the rasp is moved from one position on said shoulder area to another continuously during buffing until said edge is exposed.

4. A method as in claim 3 wherein buffing of said shoulder is discontinued when said edge is exposed and before the steel ply under the top belt or protective ply is exposed.

5. A method as in claim 1 wherein a knife having a planar face is used, the knife having a cutting tip at one edge of the face, the planar face of the knife blade being disposed at a steeper angle of attack relative to a plane generally tangent to the surface of said crown and including the point of contact of said tip and said crown at the start of said severing step, and then adjusting said angle of attack to a less steep angle for the remainder of the severing step.

6. A method as in claim 5 wherein said steeper angle is about 10 degrees and said less steep angle is 5 degrees.

7. A method as in claim 1 wherein said top belt or protector ply is cut free and then the shoulder area is buffed to provide an even profile.

8. A method as in claim 7 wherein the tire having the top belt or protector ply severed from the carcass is repaired to remove any deeper imperfections in the cut surface of the crown.

9. A method for conditioning a tire for recapping, the tire being of the kind having a plurality of superimposed circumferential belts in the under-tread portion, said belts having side edges adjacent the shoulders of the tread portion of the tire, said method comprising: removing rubber from the shoulder area on at least one side of the tire to form a circumferential open-sided groove having a side wall and having a bottom wall which is disposed at a level below one belt and above at least another belt; and removing said one belt by inserting a knife laterally through the groove and into the tire between said one belt and said other belt and by effecting relative rotation between the knife and the tire about the axis of the tire and moving the knife across the tire thereby severing said one belt from the remainder of the tire.

10. A method as in claim 9 wherein an open-sided groove is formed on each side of the tire.

11. A method as in claim 9 wherein the groove is formed so as to expose the side edge of said one belt.

12. Apparatus for preparing a tire for recapping comprising: means for mounting a tire in a vertical plane for rotation about a horizontal axis; a stand movable generally parallel to the tire rotation axis and toward and away from said tire mounting means; a rotatably driven rasp mounted on said stand in a position to contact a tire mounted on said mounting means; an upright knife-supporting frame having a lower end detachably fixed to said stand at a location below the rasp; a straight flat knife extending generally transversely of a tire mounted on said mounting means and means connecting the knife to the upper end of said frame, said connecting means being adjustable to permit the plane of the knife to be rotatably adjusted about a horizontal axis.

* * * * *